United States Patent [19]

Ginter, Jr.

[11] 4,415,188
[45] Nov. 15, 1983

[54] AUTOMOBILE EXHAUST PIPE CLAMPING DEVICE

[76] Inventor: Tom Ginter, Jr., Box 193, Clearfield, Ky. 40313

[21] Appl. No.: 323,601

[22] Filed: Nov. 20, 1981

[51] Int. Cl.³ .......................... F16L 25/00; F16L 13/14
[52] U.S. Cl. ................................. 285/420; 285/382.2; 285/424; 24/277
[58] Field of Search ...................... 285/420, 382.2, 419, 285/12, 174, 238, 424, 328; 24/277; 248/68 R, 68 C

[56] References Cited

U.S. PATENT DOCUMENTS

| | | | |
|---|---|---|---|
| 2,425,033 | 8/1947 | Fletcher | 248/68 CB |
| 3,879,815 | 4/1975 | Dowling et al. | 24/277 |
| 4,180,286 | 12/1979 | Ginter, Jr. | 285/420 X |
| 4,183,122 | 1/1980 | Wagner | 24/277 |
| 4,229,863 | 10/1980 | Bowden et al. | 24/277 |
| 4,262,943 | 4/1981 | Armstrong | 24/277 |
| 4,270,251 | 6/1981 | Evans et al. | 285/424 |

Primary Examiner—Richard J. Scanlan, Jr.
Attorney, Agent, or Firm—Sheridan Neimark; Karl W. Flocks

[57] ABSTRACT

A clamping member for securing pipe portions of an automobile exhaust system in which the clamping member comprises first and second generally vertically extending end flanges and a generally horizontally extending section intermediate of and interconnecting the first and second end flanges with each of the end flanges having a cut-out portion for reception of a pipe portion to be clamped therein and first and second sleeve portions adjacent opposite sides of the respective end flange for reception of the ends of a U-bolt; wherein the first and second end flanges, the section interconnecting the first and second end flanges, and the sleeve portions are formed from a one-piece blank.

4 Claims, 7 Drawing Figures

U.S. Patent     Nov. 15, 1983     4,415,188
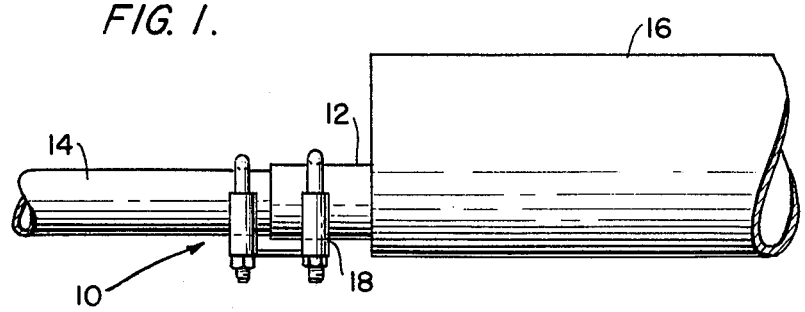
FIG. 1.
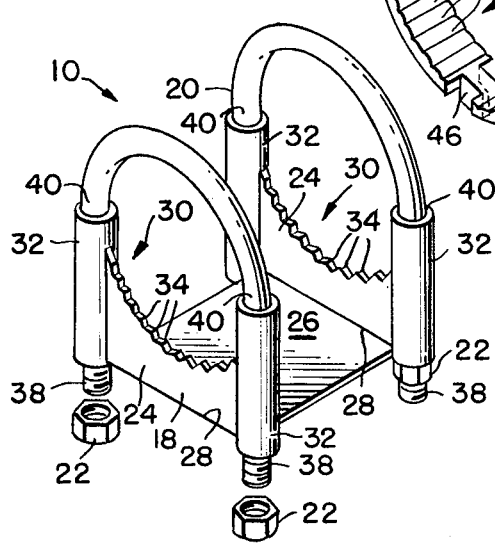
FIG. 2.
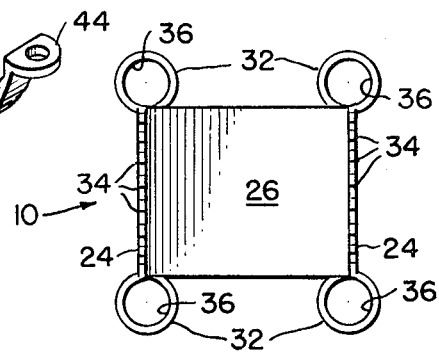
FIG. 4.
FIG. 3.
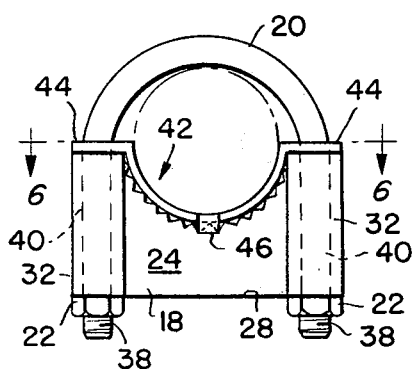
FIG. 5.
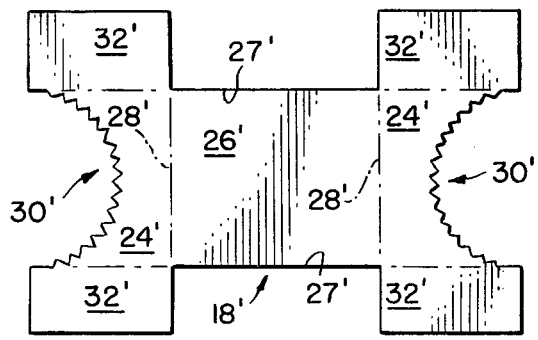
FIG. 7.
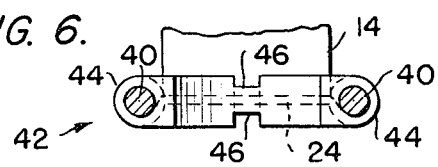
FIG. 6.

AUTOMOBILE EXHAUST PIPE CLAMPING DEVICE

BACKGROUND OF THE INVENTION

1. Field of the Invention

The field of the invention disclosed and claimed herein is believed to be best exemplified by art which may be found in the United States Patent Office in Class 285, Subclasses 114, 253, 328, 373, 382, 382.1, 382.2, 399, 403, 419, and 420 in which a preliminary search has been conducted.

2. Description of the Prior Art

The prior art listed below was in an endeavor to ascertain patentable merit in the invention disclosed and claimed herein:

U.S. Pat. No. 2,719,345-Riker
U.S. Pat. No. 2,993,255-Jagiel
U.S. Pat. No. 3,109,215-Brown
U.S. Pat. No. 3,222,090-Powers et al
U.S. Pat. No. 3,984,134-Engman et al
U.S. Pat. No. 4,141,385-Heckethorn
U.S. Pat. No. 4,147,577-Beebe
U.S. Pat. No. 4,249,759-Heckethorn
U.S. Pat. No. 4,262,943-Armstrong Of the patents listed above, Riker, Jagiel, Brown Powers et al, Engman et al, Beebe, Heckethorn '385, and Heckethorn '759, are of interest in that they disclose various forms of U-bolt clamps, each of which includes a saddle member for cooperatively clamping a U-bolt around a pipe or the like. Each of the saddle members disclosed in these patents include tubular portions for receiving only the two ends of a single U-bolt.

The Armstrong patent relates to a muffler clamp assembly which includes two plates disposed in superposed relationship to each other on the same side of the pipe sections to be coupled thereby. Each clamping plate in the Armstrong patent includes a pair of upstanding flanges for a total of four flanges. The clamping device in the Armstrong patent appears to generally resemble the structure disclosed in Applicant's prior U.S. Pat. No. 4,180,286 of which the invention disclosed in the instant application constitutes an improvement.

SUMMARY OF THE INVENTION

The present invention was conceived as an improvement over my prior art invention for which U.S. Pat. No. 4,180,286, mentioned above, have been granted. As in the prior patent granted to Applicant, the present invention was conceived as a result of Applicant's awareness of dangerous and/or potentially dangerous conditions of automotive exhaust systems, which frequently result from stresses to which exhaust pipe joints are subjected. These stresses tend to alternatively pull, push, and twist the pipe joints, which joints if not tightly secured will undergo amplified stress due to vibration both rectilinear and torsional in nature such that separation and failure is hastened to the point that exhaust leakage will develop and possibly reach the passenger area.

With the foregoing problem in mind, Applicant has developed the present invention with the object of providing safe clamping structure for exhaust pipe joints.

In particular it is an object of this invention to provide a clamp assembly for automobile exhaust pipe elements which would under ordinary use not allow the pipe elements to be pulled apart.

It is another object of this invention to provide a two-in-one or two-fold clamping structure for joints of automotive exhaust systems.

It is yet another object of this invention to provide rigid means for securely holding together the pipes forming a joint of an automotive exhaust system.

It is a further object of this invention to provide a clamping arrangement whereby spaced-apart exhaust pipe portions are held together securely.

It is moreover an object of this invention to provide an exhaust system wherein the pipe elements forming a joint are held in both secure and rigid relationship with each other for safety.

It is a further object of this invention to provide a clamping arrangement which may be readily combined with a conversion bracket for adapting the device to flexible pipe portion without danger of cutting the latter.

Other objects and advantages of the present invention will be readily discernible to the reader upon closer examination of the following description taken in conjunction with the accompanying drawings.

BRIEF DESCRIPTION OF THE DRAWINGS

Referring briefly to the drawings, the reader will readily visualize the preferred embodiment of the present invention wherein:

FIG. 1 represents a side elevational view of a connection between an exhaust pipe and the muffler of an automobile utilizing the clamping device according to the invention disclosed herein;

FIG. 2 is an enlarged view in perspective of the clamping device of FIG. 1 prior to installation on parts to be clamped thereby;

FIG. 3 is a top plan view of the arrangement shown in FIG. 2;

FIG. 4 is a view in perspective of a conversion bracket for use with the device of FIG. 2 to clamp a flexible pipe section;

FIG. 5 is a side elevational view of the device shown in FIG. 2 and of the bracket of FIG. 4 combined therewith;

FIG. 6 is a horizontal sectional view along the plane 6—6 in FIG. 5; and

FIG. 7 is a plan view of preformed blank from which the clamping device of FIG. 2 is formed.

DETAILED DESCRIPTION OF THE INVENTION

Referring now to the drawings with greater particularity, the reader will readily appreciate from FIG. 1 that according to the inventive concept disclosed and claimed herein resides in a clamping unit 10 applied to two pipe portions 12,14 of an automobile exhaust system which includes a muffler 16 or like member. As may be more clearly seen in FIGS. 2 and 3, clamping unit 10 comprises a bracket or clamping member 18, two U-bolts 20, and two pairs of nuts 22. Bracket or clamping member 18, which is formed from the one-piece sheet metal blank 18' illustrated in FIG. 7, comprises first and second generally vertically extending end flanges 24, 24 integral with and at opposite ends of a generally horizontally extending intermediate section 26. Intermediate section 26 interconnects end flanges 24, 24 along folded edges 28,28. Each end flange 24 is formed with a cut-out portion arcuate pipe receiving portion 30 and first and second hallow sleeve portions 32, 32 adjacent opposite side edges of the end flange 24. Each arcuate pipe receiving portion 30 is formed with a plurality of teeth, serrations 34 or the like which provide a secure clamping of the pipe portions 12 or 14 to be coupled thereby. Each hollow sleeve portion 32 is formed with a through bore 36 through which the end 38 of a leg 40 of a U-bolt 20 is passed. Each end 38 of the U-bolt legs 40 is threaded to facilitate clamping relationship with a nut 22 to be applied thereon.

Use of clamping unit to couple pipe portions 12, 14 is carried out by locating clamping member 18 with intermediate section 26 extending generally parallel to pipe sections 12, 14; end flanges 24, 24 extending laterally to pipe portions 12, 14; and pipe receiving portions 30, 30 and teeth or serrations 34 in contact with pipe portions 12, 14. Next a first U-bolt 20 is applied to the assembly by inserting the ends 38 of its legs 40 into and through the open through bores 36 of a first end flange 24, and applying nuts 22 to the threaded ends 38 of legs 40 projecting beyond the sleeve portions 32, 32. Coupling of pipe portions 12, 14 may then be completed by applying a second U-bolt 20 and a second set of nuts 22, 22 to the sleeve portions 32, 32 of the second end flange 24.

While bracket or clamping member 18 is formed from a one-piece blank 18', it is within the contemplation of the disclosed inventive concept to be used in conjunction with a conversion bracket 42 so as to be adapted to securing a flexible pipe portion without teeth or serrations 34 tearing up or cutting into such flexible pipe portion. Conversion bracket 42, as may be seen in FIG. 4, is generally U-shaped in configuration, of substantially greater width than the thickness of clamping member 18, and includes an apertured lug 44 at each end thereof for registration with the through bores 36 at the top of sleeve portions 32 of end flanges 24 for passage of the leg 40 of a U-bolt 20. Conversion bracket 42 also includes a pair of downwardly directed ears 46 which in assembly of bracket 42 will extend along opposite sides of the end flange 24, as may be seen in FIGS. 5 and 6, to ensure that bracket 42 will remain in substantially the same plane as the end flange 24 on which it is assembled. Instead of teeth, the pipe contacting portion of conversion bracket 42 may be provided with rounded protuberances 48 or even with a smooth surface.

Blank 18' from which clamping member 18 is formed, as may be seen in FIG. 7, comprises a central web portion 26' having first and second spaced apart edges 27', 27' and first and second flanges 24', 24' at opposite ends of the web portion 26'. The first and second flanges 24', 24' each has an outwardly directed, arcuate cut-out 30', and oppositely directed wing-like portions 32', 32' extending beyond the first and second edges 27', 27' of the central web portion 26'. To form clamping member 18 from blank 18', each wing-like portion 32' is rolled toward cut-out 30' with any suitable tool into a sleeve portion 32 in tubular form, for example. Each 24' is then bent upwardly from the plane of central web portion 26' along lines 24' to provide a clamping member 18 as illustrated in FIG. 2.

It will be obvious to those skilled in the art that various changes may be made without departing from the scope of the invention and therefore the invention is not limited to what is shown in the drawings and described in the specification, but only as indicated in the appended claims.

What is claimed is:

1. A clamping member using a pair of U-bolts for securing pipe portions of an automobile exhaust system to each other, said clamping member comprising
   first and second generally vertically extending end flanges spaced from each other,
   a generally horizontally extending section intermediate of and connecting to each of said first and second end flanges at an edge thereof,
   each of said end flanges having a cut-out portion on an opposite edge from the edge connected to said intermediate section for reception of a pipe portion to be clamped therein,
   first and second sleeve portions connected to remaining opposite edges of each of said end flanges adapted to receive and support respective legs of each of the U-bolts,
   said first and second end flanges, said intermediate section, and said sleeve portions being integral and formed from a single blank.

2. The clamping member as defined in claim 1 wherein each of said sleeve portions is generally tubular and is formed by rolling a previously laterally extending portion of the end flange integral therewith.

3. The clamping member as defined in claim 2 wherein each of said cut-out portions is generally semicircular and includes a plurality of teeth or serrations for gripping a pipe portion to be secured thereby.

4. The clamping member as defined in claim 1, 2, or 3 in combination with a conversion bracket for adapting said clamping member to receiving and securing a flexible pipe portion without cutting into the latter, said conversion bracket being generally U-shaped in configuration, of substantially greater width than the thickness of said clamping member, and having an apertured lug at each end thereof for registration with the top of the sleeve portions of one of said end flanges for passage of a U-bolt and a pair of downwardly directed ears, which in assembly of said bracket on said one of said end flanges will extend along opposite sides of said one of said end flanges to ensure that bracket will remain in substantially the same plane with said one of said end flanges.

* * * * *